United States Patent
Seto et al.

(10) Patent No.: US 7,920,567 B2
(45) Date of Patent: Apr. 5, 2011

(54) SWITCHING HUB AND LAN SYSTEM

(75) Inventors: Koichiro Seto, Amimachi (JP); Akihiro Sekiguchi, Tsuchiura (JP)

(73) Assignee: Hitachi Cable, Ltd., Tokyo (JP)

( * ) Notice: Subject to any disclaimer, the term of this patent is extended or adjusted under 35 U.S.C. 154(b) by 182 days.

(21) Appl. No.: 12/026,946

(22) Filed: Feb. 6, 2008

(65) Prior Publication Data

US 2008/0186981 A1    Aug. 7, 2008

(30) Foreign Application Priority Data

Feb. 7, 2007 (JP) ................................. 2007-028511

(51) Int. Cl.
  *H04L 12/56* (2006.01)
  *H04L 12/28* (2006.01)
(52) U.S. Cl. ..................... 370/392; 370/395.53; 370/401
(58) Field of Classification Search .................. None
  See application file for complete search history.

(56) References Cited

U.S. PATENT DOCUMENTS

| | | | | |
|---|---|---|---|---|
| 6,633,567 B1* | 10/2003 | Brown | ......................... | 370/395.3 |
| 2005/0138149 A1* | 6/2005 | Bhatia | ........................... | 709/220 |
| 2005/0220105 A1* | 10/2005 | Yen et al. | ....................... | 370/392 |
| 2007/0097968 A1* | 5/2007 | Du | .................................. | 370/389 |
| 2007/0140277 A1* | 6/2007 | Chen et al. | ..................... | 370/404 |
| 2007/0147393 A1* | 6/2007 | Wu et al. | ................... | 370/395.53 |
| 2008/0002720 A1* | 1/2008 | Chao et al. | ................ | 370/395.53 |

FOREIGN PATENT DOCUMENTS

| | | |
|---|---|---|
| CN | 1852240 A | 10/2006 |
| JP | 2003-60675 | 2/2003 |
| JP | 2003-318937 | 11/2003 |
| WO | WO 2004/066563 A1 | 8/2004 |

OTHER PUBLICATIONS

Shimizu, "Ring Network with VLAN Tag", IEEJ Trans, EIS, Oct. 1, 2005, pp. 1602-1607, vol. 125, No. 10.
Chinese Official Action dated Mar. 31, 2010 together with an English language translation.

* cited by examiner

*Primary Examiner* — Pankaj Kumar
*Assistant Examiner* — Marcus R Smith
(74) *Attorney, Agent, or Firm* — Scully, Scott, Murphy & Presser, P.C.

(57) ABSTRACT

A switching hub is provided with a control unit for setting, for a port, a VLAN-ID comprising a subgroup ID of a subgroup constituting a VLAN, and a sub-ID of a group contained in the subgroup ID, and a switching processing unit for relaying a frame, which contains the VLAN-ID, via the port, which matches the VLAN-ID.

10 Claims, 7 Drawing Sheets

FIG.2

| PORT No. | RECEIVE PORT | TRANSMIT PORT |
|---|---|---|
| 3A | VLAN1-1 | VLAN1-2<br>VLAN1-3<br>VLAN1-4 |
| 3B | VLAN1-2 | VLAN1-1<br>VLAN1-3 |
| 3C | VLAN1-3 | VLAN1-1<br>VLAN1-2 |
| 3D | VLAN1-4 | VLAN1-1 |

| VLAN-ID | SUBGROUP ID PORTION | SUB-ID PORTION |
|---------|---------------------|----------------|
| VLAN1-1 | 1 | 1 |
| VLAN1-2 | 1 | 2 |
| VLAN1-3 | 1 | 3 |
| VLAN1-4 | 1 | 4 |
| ⋮ | ⋮ | ⋮ |

SWITCHING HUB AND LAN SYSTEM

The present application is based on Japanese patent application No. 2007-028511 filed on Feb. 7, 2007, the entire contents of which are incorporated herein by reference.

BACKGROUND OF THE INVENTION

1. Field of the Invention

This invention relates to a switching hub and a LAN system.

2. Description of the Related Art

With the widespread use of personal computers and the Internet, many companies have an Ethernet (registered trademark) local area network (LAN) built and utilized for various businesses. In large companies, because of their large-scale local area network, virtual LAN (herein referred to as VLAN) technology is widely utilized that allows the network to be grouped for each post or project.

The VLAN is a technology for virtually grouping computers on a LAN regardless of physical cable wiring or computer installation places, and is standardized by IEEE (Institute of Electrical and Electronic Engineers) 802.1Q, and many switching hubs equipped with a VLAN function are now offered commercially. Use of the VLAN function allows dividing computers connected to the same switching hub into different groups, or combining computers connected to different switching hubs into the same group.

A switching hub with a VLAN function receives from a computer connected to its port a data frame configured based on a data communication standard format, and adds to the frame 4-byte data called a tag indicative of a VLAN to which that computer belongs, and relays to another switching hub. The switching hub with the VLAN function, which has received the tag-added frame, deciphers the tag to determine the VLAN to which the frame belongs, and relay the tag-removed frame to a port corresponding to that VLAN. Herein this function is referred to as IEEE802.1Q tag VLAN.

The switching hub has plural ports connected to a network, and matches a destination address of a received frame and an address corresponding to a port registered in an address learning table, to relay the frame to a port connected to a destination terminal. This switching hub is added with a VLAN function, which results in the above switching hub with the VLAN function.

As such a switching hub used to build many independent VLANs, there is a switching hub in which a frame is added with an extended VLAN tag comprising VLAN domain ID and VLAN-ID (see, e.g., JP-A-2003-318937).

The switching hub of JP-A-2003-318937, when receiving a frame added with an extended tag having registered VLAN domain ID set therein, relays the frame, based on VLAN-ID set in this extended tag. When receiving a frame added with not an extended tag having registered VLAN domain ID set therein, but an extended tag having unregistered VLAN domain ID set therein, or a frame added with a 802.1Q tag, it determines the frame as having no tag, and relays the frame.

The switching hub of JP-A-2003-318937 allows plural mutually-unaffected independent VLANs to be built on a network because the frame is relayed by being determined as a different VLAN frame even when its VLAN-ID is the same, but when its VLAN domain is different.

As described above, many companies build a network using the VLAN. Accordingly, in backbone networks built by carriers, to provide broadband LAN connection services for companies, it is necessary to recognize a subscriber (company)-transmitted frame, make receivable and transmissible VLANs settable respectively for each port, and have plural groups of those settings.

There is a demand to make relays for a VLAN to which a computer belongs possible from all VLANs to which each project belongs, but to make relays between VLANs to which each project belongs settable respectively to permit some of the VLANs and prohibit the other.

For example, assuming that when connecting a VLAN to which a computer belongs to a port A, a VLAN to which a project B belongs to a port B, a VLAN to which a project C belongs to a port C, and a VLAN to which a project D belongs to a port D, there is a demand for the following VLAN settings for the relays between the ports in the switching hub:

1) Port A (computer)→port B (project B): permit
2) Port A (computer)→port C (project C): permit
3) Port A (computer)→port D (project D): permit
4) Port B (project B)→Port A (computer): permit
5) Port B (project B)→port C (project C): permit
6) Port B (project B)→port D (project D): prohibit
7) Port C (project C)→Port A (computer): permit
8) Port C (project C)→port B (project B): permit
9) Port C (project C)→port D (project D): prohibit
10) Port D (project D)→Port A (computer): permit
11) Port D (project D)→port B (project B): prohibit
12) Port D (project D)→port C (project C): prohibit When using a typical port VLAN or IEEE802.1Q tag VLAN to realize the VLANs, each port VLAN setting is required to be the same for all ports:
Port A: VLAN1 (computer)
Port B: VLAN1 (project B)
Port C: VLAN1 (project C)
Port D: VLAN1 (project D)

However, this setting has the problem of relaying to the prohibited relay 6 port although relay 1 is permitted to be performed. Even relays 2-5 also have the problem of leaking to the other ports although the relays themselves are permitted to be performed.

In order to prevent this, when building plural VLANs, setting the plural VLANs for the ports to perform router routing between the VLANs is considered, but there is the problem that when building plural independent VLANs, a router which is adaptable for this is required, which makes configuration and setting complicated, leading to an increase in cost.

SUMMARY OF THE INVENTION

Accordingly, it is an object of this invention to provide a switching hub and a LAN system using the switching hub, capable of flexibly adapting to frame relay settings without making the configuration of network devices complicated even in an environment where a plurality of VLANs are provided.

(1) In accordance with one aspect of the invention, a switching hub comprises:
a control unit for setting, for a port, a VLAN-ID comprising a subgroup ID of a subgroup constituting a VLAN, and a sub-ID of a group contained in the subgroup ID; and
a switching processing unit for relaying a frame, which contains the VLAN-ID, via the port, which matches the VLAN-ID.

(2) In accordance with another aspect of the invention, a VLAN system comprises:
a switching hub comprising a control unit for setting, for a port, a VLAN-ID comprising a subgroup ID of a subgroup constituting a VLAN, and a sub-ID of a group contained in the subgroup ID; and a switching processing unit for relaying a frame, which contains the VLAN-ID, via the port, which matches the VLAN-ID, wherein the VLAN system receives a frame relayed to the switching hub from a transmitting source constituting the VLAN at the port set to the VLAN-ID, and relays it from the switching hub to a destination via the port set to the VLAN-ID.

According to this invention, it is possible to flexibly adapt to frame relay settings without making the configuration of network devices complicated even in an environment where a plurality of VLANs are provided.

BRIEF DESCRIPTION OP THE DRAWINGS

The preferred embodiments according to the invention will be explained below referring to the drawings, wherein:

FIG. 2 is a diagram showing VLAN-ID settings for each port of a port unit;

FIGS. 3A and 3B are a diagram showing a format of a frame transmitted through a network, wherein FIG. 3A is a diagram showing an entire frame, and FIG. 3B is a diagram partially showing an IEEE802.1Q VLAN tag of the frame shown in FIG. 3A;

DETAILED DESCRIPTION OF THE PREFERRED EMBODIMENTS

Switching Hub Configuration

Figure 1:
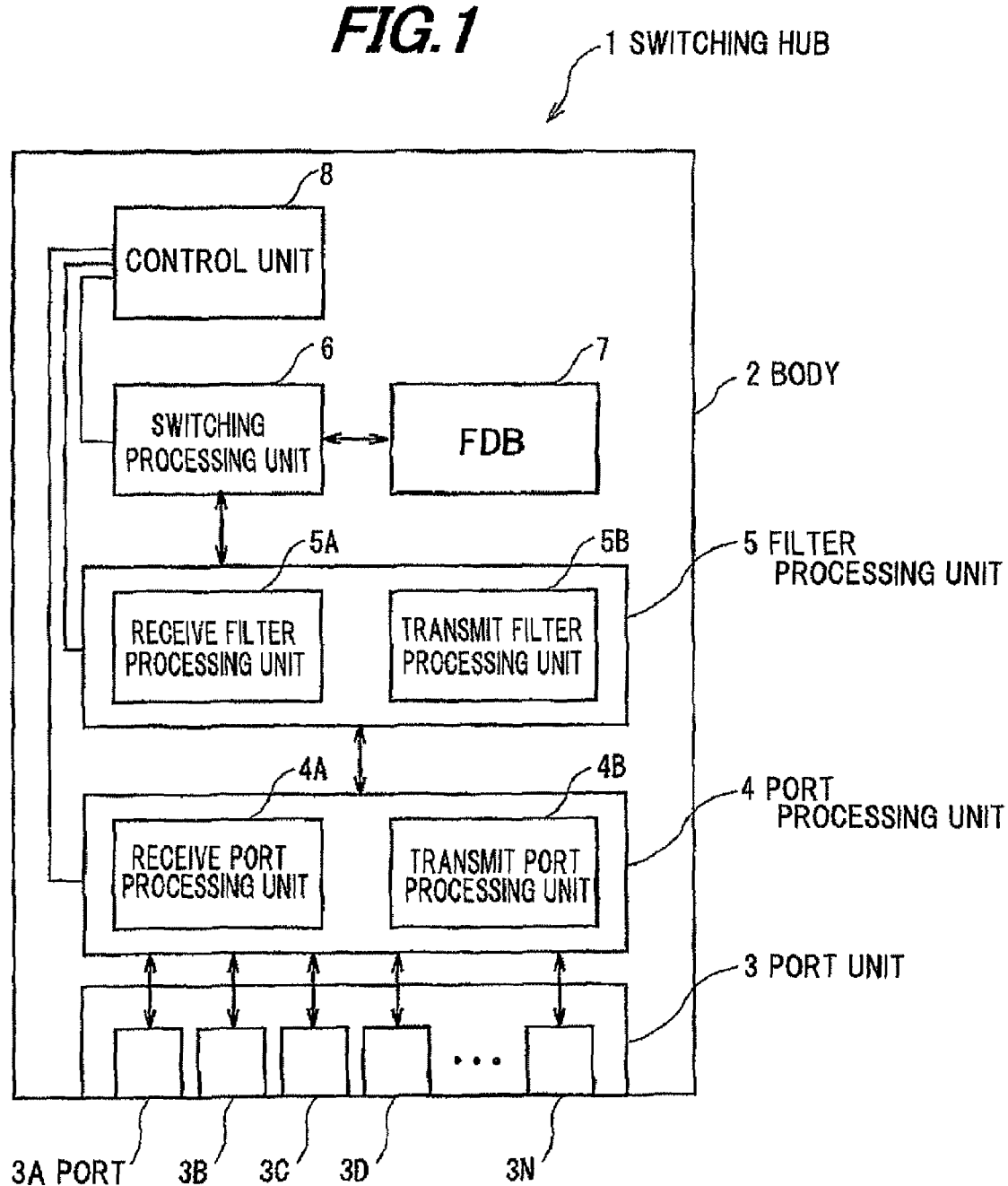
FIG. 1 is a schematic configurational diagram showing a switching hub in this embodiment.

FIG. 1 is a schematic configurational diagram showing a switching hub in this embodiment. This switching hub 1 includes a port unit 3 comprising plural ports 3A-3N provided for connecting communication cables, such as LAN cables, etc., to a side of a body 2, a port processing unit 4 comprising a receive port processing unit 4A and a transmit port processing unit 4B, a filter processing unit 5 comprising a receive filter processing unit 5A and a transmit filter processing unit 5B, a switching processing unit 6 for determining a frame-relaying VLAN, a FDB (Forwarding Data Base) 7 with frame destination addresses registered therein, and a control unit 8 for setting VLAN-IDs corresponding to the plural ports 3A-3N respectively of the port unit 3.

The port unit 3 comprises the plural ports 3A-3N to which LAN communication cables are connectable.

The port processing unit 4 is for adding and deleting a VLAN tag to and from a frame relayed to the switching hub 1.

The filter processing unit 5 is for referencing a VLAN-ID of the VLAN tag added to the frame to relay to the relevant port processing unit 4 or discard the frame.

The switching processing unit 6 retrieves from the FDB 7 a source MAC (Media Access Control) address and a VLAN subgroup ID (described later) as retrieval information contained in the frame input from the receive filter processing unit 5A of the filter processing unit 5, to thereby determine the content of a relay of the frame, i.e., unicast, multicast, or flooding, to relay to the transmit filter processing unit 5B of the filter processing unit 5. Also, when the retrieved result of the FDB 7 is unregistered, a receive port, a source MAC address, and a VLAN subgroup ID of that frame are registered into the FDB 7.

The receive port processing unit 4A references the frame input through the port unit 3 into the switching hub 1, and when a VLAN tag is added to the frame, relays the frame directly to the filter processing unit 5. Also, when no VLAN tag is added to the frame, the receive port processing unit 4A adds a VLAN tag to the frame according to a VLAN setting of the receive port.

The transmit port processing unit 4B references the frame relayed from the transmit filter processing unit 5B of the filter processing unit 5, and when the relevant transmit port has no tag, deletes the VLAN tag from the frame, to relay to the corresponding port of the port unit 3. Also, when the relevant transmit port has a tag, the transmit port processing unit 4B relays the VLAN tag added to the frame directly to the port of the port unit 3.

The receive filter processing unit 5A references a VLAN-ID 13D of the frame shown in FIG. 3 relayed from the receive port processing unit 4A, and when the VLAN-ID 13D of the frame matches a set VLAN-ID of the receive port, relays the frame to the switching processing unit 6. Also, when the VLAN-ID 13D of the frame does not match the set VLAN-ID of the receive port, the receive filter processing unit 5A does not relay to the switching processing unit 6, but discards the frame.

The transmit filter processing unit 5B references the VLAN-ID of the frame relayed from the switching processing unit 6, and when the VLAN-ID of the frame matches a set VLAN-ID of the transmit port, relays the frame to the transmit port processing unit 4B. Also, when the VLAN-ID 13D of the frame does not match the set VLAN-ID of the transmit port, the transmit filter processing unit 5B does not relay to the transmit port processing unit 4B, but discards the frame.

In this embodiment, a subscriber company A builds a VLAN 1 using the switching hub 1. Herein are explained the frame relays in the VLAN 1.

FIG. 2 is a diagram showing VLAN-ID settings for each port of a port unit. This embodiment shows VLAN-ID settings of receive and transmit ports in the ports 3A-3D of the port unit 3 shown in FIG. 1. Such settings are made by the control unit 8.

Here, the receive ports refer to a port at which the switching hub 1 receives a relayed frame, and the transmit ports refer to a port at which the switching hub 1 transmits a frame to be relayed, and can relay a VLAN frame based on a VLAN-ID defined in the transmit ports, from the switching hub 1 to a transmitted destination.

Also, in this embodiment, the ports 3A-3D have no tag. Also, VLAN1-1 to VLAN1-4 belong to a subgroup of the VLAN1, and each port has corresponding set VLAN-ID.

The port 3A has VLAN1-1 set as a receive port, and VLAN1-2, VLAN1-3, and VLAN1-4 set as a transmit port.

The port 3B has VLAN1-2 set as a receive port, and VLAN1-1 and VLAN1-3 set as a transmit port.

The port 3C has VLAN1-3 set as a receive port, and VLAN1-1 and VLAN1-2 set as a transmit port.

The port 3D has VLAN1-4 set as a receive port, and VLAN1-1 set as a transmit port.

Figures 3A, 3B:
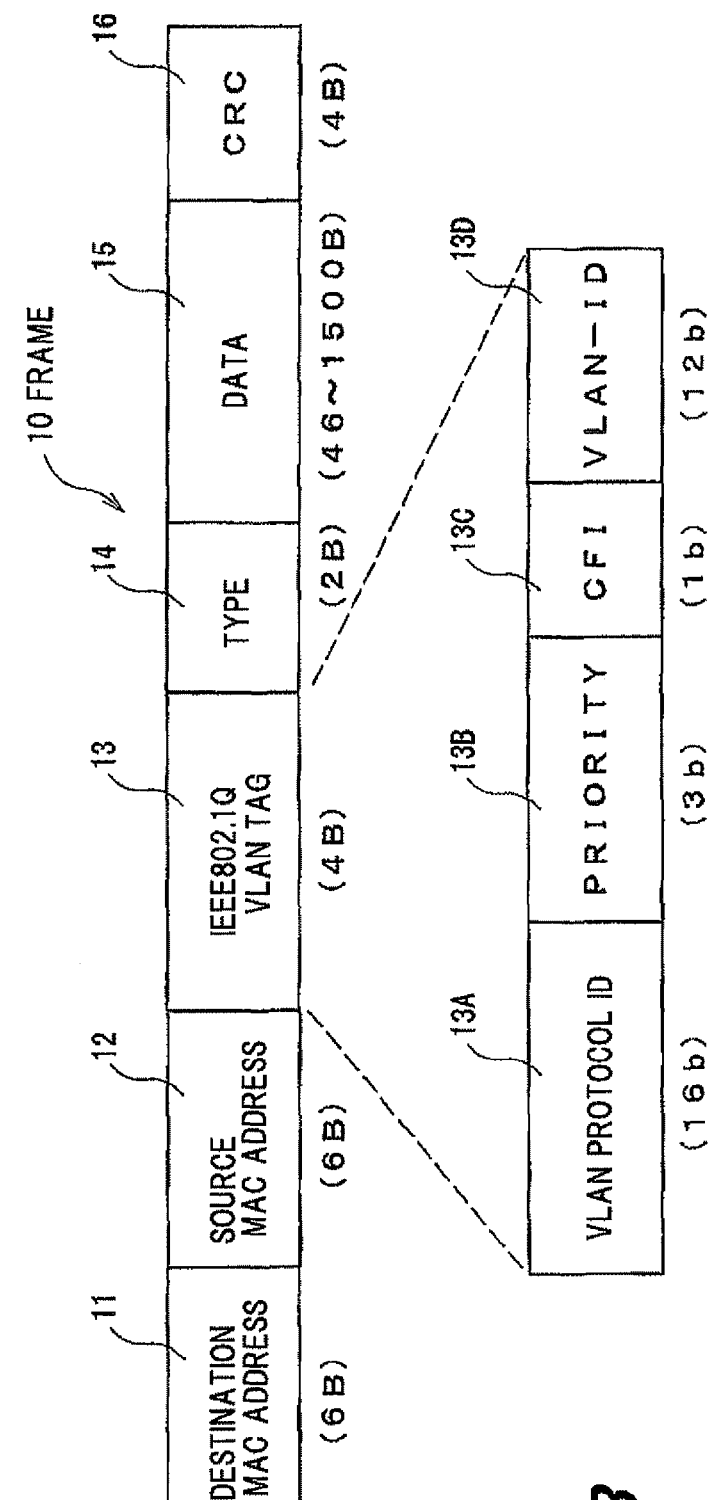

FIGS. 3A and 3B are a diagram showing a format of a frame transmitted through a network, wherein FIG. 3A is a diagram showing an entire frame, and FIG. 3B is a diagram partially showing an IEEE802.1Q VLAN tag of the frame shown in FIG. 3A.

As shown in FIG. 3A, a frame 10 comprises a 6-byte destination MAC address 11, a 6-byte source MAC address 12, a 4-byte IEEE802.1Q VLAN tag (herein referred to as a VLAN tag) 13, a 2-byte type 14 for setting ID indicative of a higher-layer protocol stored in data 15, 46-1500-byte data 15, and a 4-byte CRC (Cyclic Redundancy Check) 16 used for error checks.

As shown in FIG. 3B, the VLAN tag 13 comprises a 16-bit VLAN protocol ID 13A, a 3-bit priority 13B for indicating a priority, a 1-bit CFI (Canonical Format Indicator) 13C for indicating presence/absence of an optional RIF (Routing Information Field), and a 12-bit VLAN-ID 13D for representing a group to which the frame 10 belongs.

Figures 4, 5:
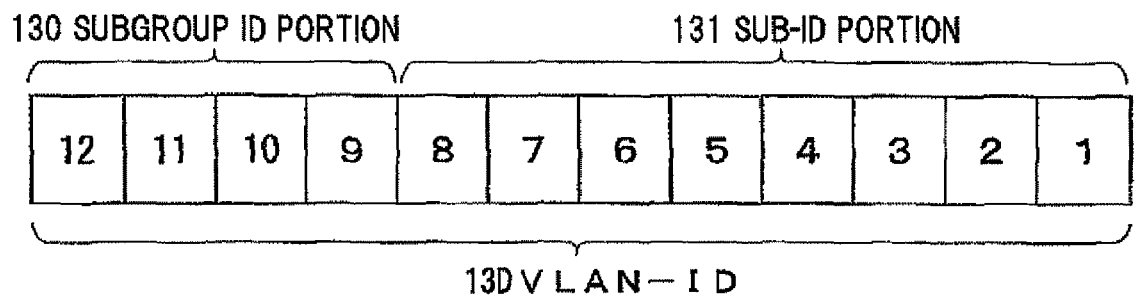
FIG. 4 is a diagram showing VLAN-ID 13D of FIG. 3B.
FIG. 5 is a diagram showing settings of the VLAN-ID shown in FIG. 4.

FIG. 4 is a diagram showing the VLAN-ID 13D of FIG. 3B. The VLAN-ID 13D comprises a 4-bit subgroup ID portion 130 for indicating a subgroup of a VLAN, and a 8-bit sub-ID portion 131 for indicating sub-IDs in the subgroup.

FIG. 5 is a diagram showing settings of the VLAN-ID shown in FIG. 4. When defining a VLAN built by a company A in this embodiment as subgroup 1 and defining subgroups included in the subgroup 1, values for the subgroup ID portion 130 and the sub-ID portion 131 that constitute the VLAN-ID are set as shown.

Here, when defining a first VLAN in the subgroup 1, its VLAN-ID 13D is VLAN1-1, and a "1" is set in the VLAN subgroup ID portion 130, and a "1" is set in the VLAN sub-ID portion 131. Also, when defining a fourth VLAN in the subgroup 1, a "1" is set in the VLAN subgroup ID portion 130, and a "4" is set in the VLAN sub-ID portion 131.

Such settings can be made, for example, by connecting a device, such as a personal computer (herein referred to as a PC), to the switching hub 1 with a LAN cable or the like to use telnet connection or the like to command-line access control software stored in a nonvolatile memory incorporated in the switching hub 1.

To save the settings, inputting the settings is followed by saving them in the nonvolatile memory. The control unit 8 controls the port processing unit 4, filter processing unit 5, and switching processing unit 6, in accordance with the VLAN-ID settings stored in the nonvolatile memory.

Figure 6:
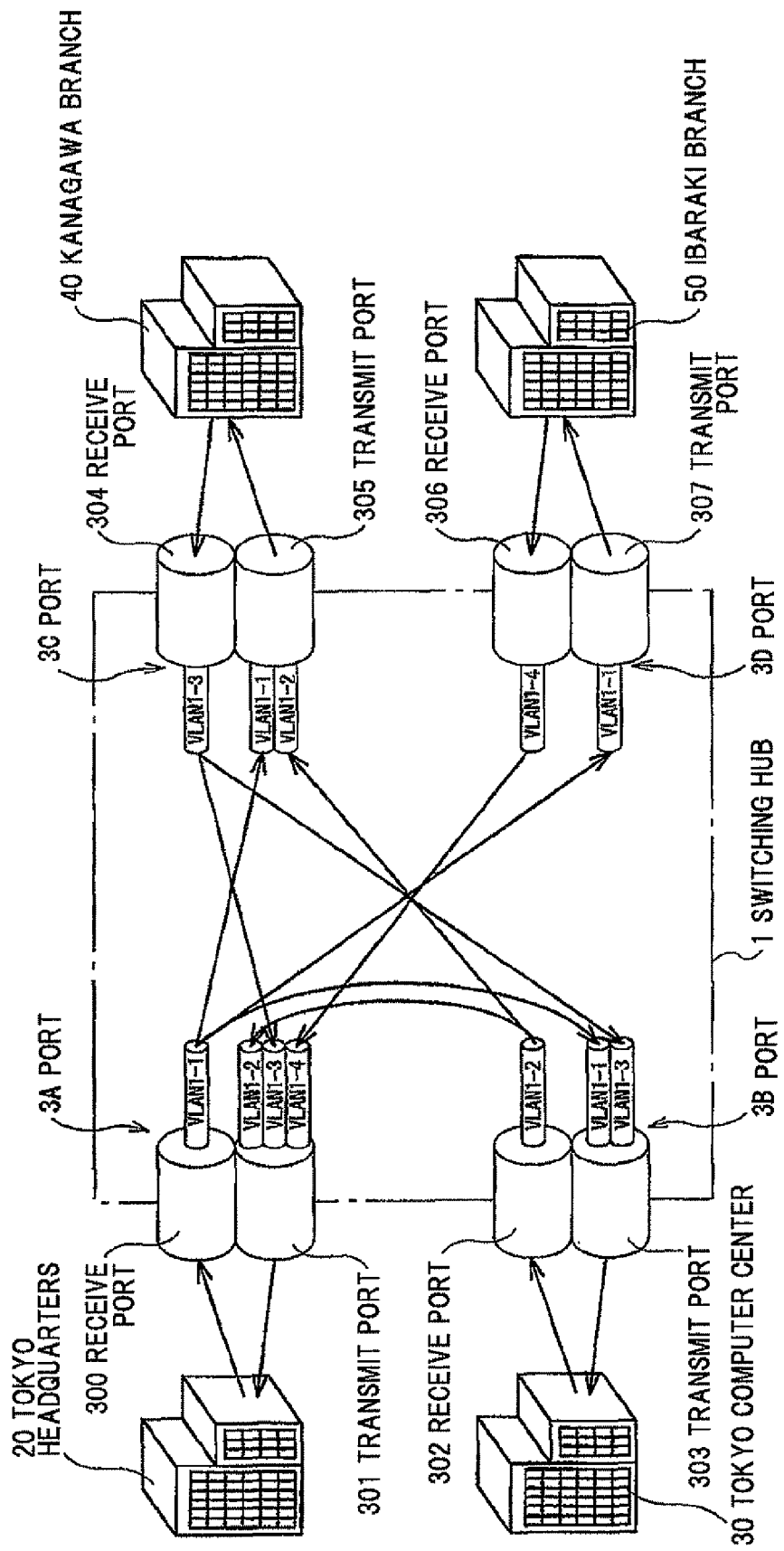
FIG. 6 is a diagram showing a network system built using the switching hub of this embodiment.

FIG. 6 is a diagram showing a network system built using the switching hub of this embodiment. The VLANs of the company A connected using the switching hub 1 will be explained below referring to each figure.

In FIG. 6, receiving and transmitting in the switching hub 1 are drawn as being functionally separated because of different settings for receive and transmit ports in the same port.

The VLAN network of the company A is built by Tokyo headquarters 20, Tokyo computer center 30, Kanagawa branch 40, and Ibaraki branch 50, where the subgroup is defined as "1", the sub-ID of Tokyo headquarters 20 is defined as "VLAN1-1", the sub-ID of Tokyo computer center 30 "VLAN1-2", the sub-ID of Kanagawa branch 40 "VLAN1-3", and the sub-ID of Ibaraki branch 50 "VLAN1-4". Such settings are made by the above-mentioned control unit 8 of the switching hub 1.

Figure 7:
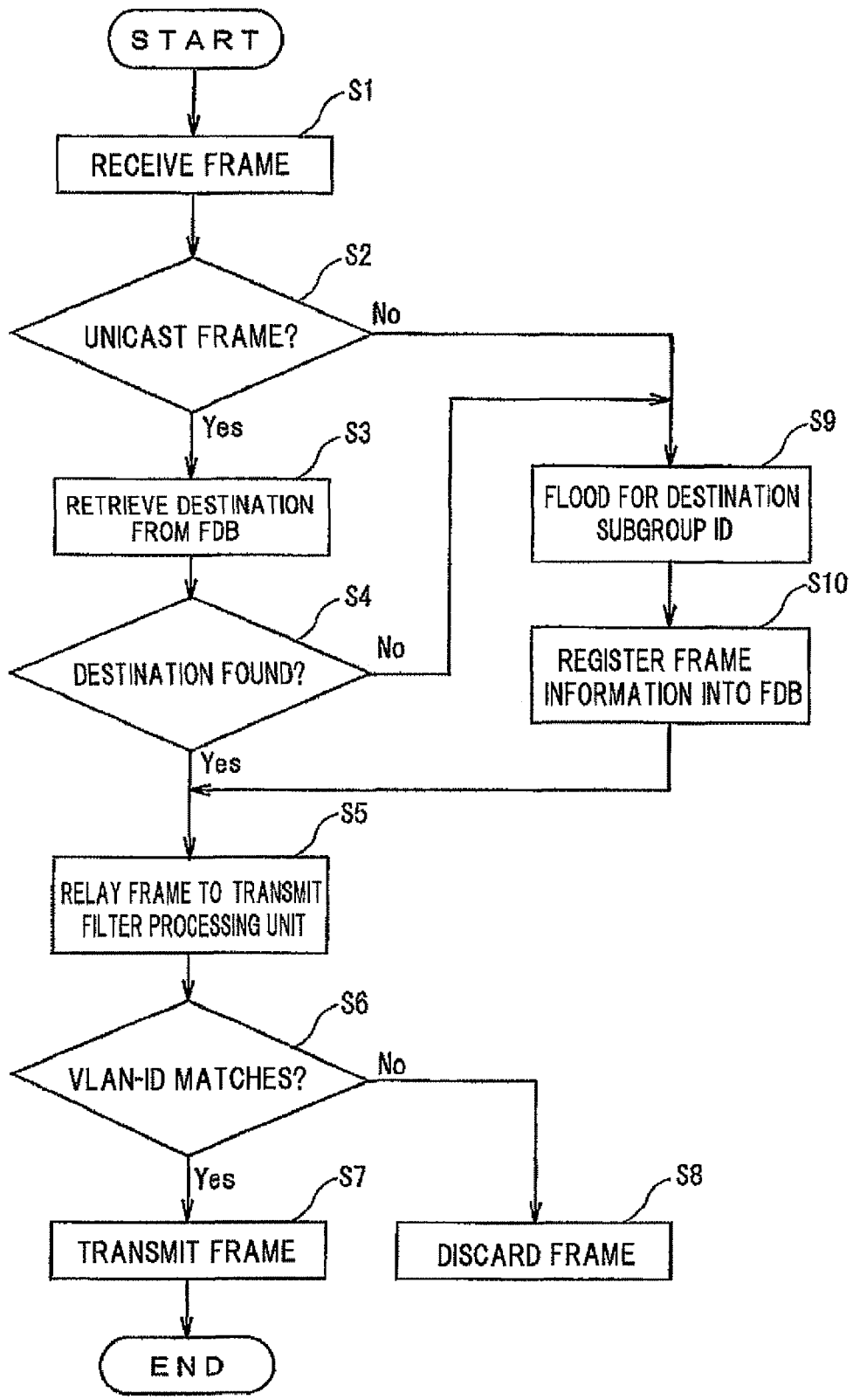
FIG. 7 is a flowchart showing frame relay processing in the switching hub of this embodiment.

FIG. 7 is a flowchart showing frame relay processing in the switching hub of this embodiment. The frame relays from Tokyo headquarters 20 to Ibaraki branch 50 will be explained below referring to each figure.

(S1) When, in the Tokyo headquarters 20, a unicast frame for destination Ibaraki branch 50 is first relayed to the switching hub 1 from a PC belonging to an in-house LAN, the switching hub 1 receives this frame at a receive port 300 in a port 3A, and relays the received frame to a receive port processing unit 4A.

Here, since no VLAN tag is added to the frame relayed to the switching hub 1, the receive port processing unit 4A adds a VLAN tag 13 to the frame according to the VLAN-ID setting of the receive port 300. Since the VLAN-ID of the receive port 300 is set VLAN1-1, the subgroup ID portion 130 of the VLAN-ID 13D added to the frame is 1 and the sub-ID portion 131 thereof is 1. This frame added with the VLAN-ID 13D-containing VLAN tag 13 is relayed via a receive filter processing unit 5A to a switching processing unit 6.

(S2, Yes) The switching processing unit 6 references a destination MAC address 11 of the frame relayed from the receive filter processing unit 5A, to determine the frame as unicast for VLAN1-4. (S3) Information registered in a FDB 7 is retrieved with respect to a set of the subgroup ID portion 130 and a source MAC address 12 of the frame.

(S4, Yes) If the retrieval result is found in the information registered in the FDB 7, then the switching processing unit 6 determines that frame as learned unicast. (S5) It relays the frame for a destination transmit port based on the FDB 7-registered information to a transmit filter processing unit 5B, where in the case of destination Ibaraki branch 50, the destination transmit port is a transmit port 307 of a port 3D.

(S6, Yes) The transmit filter processing unit 5B references the VLAN-ID 13D of the frame relayed from the switching processing unit 6, and when the VLAN-ID 13D of the frame matches a set VLAN-ID of the destination transmit port 307 of the port 3D, relays the frame to a transmit port processing unit 4B.

(S7) Since the relayed frame has the VLAN tag 13 while the port that transmits this frame has no tag, the transmit port processing unit 4B deletes the VLAN tag 13 from the frame and transmits from the transmit port 307 of the port 3D, to relay the frame to the Ibaraki branch 50.

In this manner, by providing the subgroup ID portion 130 and the sub-ID portion 131 in the VLAN-ID 13D contained in the VLAN tag 13, and adding the VLAN tag 13 to the switching hub 1-relayed frame the according to the port VLAN-ID setting, it is possible to define plural VLANs even without using any router, and facilitate switching thereof.

In the above switching hub 1 frame relay, there is the registered information in the FDB 7 and the frame is relayed to the destination Ibaraki branch 50 as learned unicast. (S6, No) If the subgroup ID portion 130 and the sub-ID portion 131 set in the VLAN-ID 13D of the learned unicast frame do not match the set VLAN-ID of the transmit port, (S8) then the transmit filter processing unit 5B discards the frame, so as not to leak the relay into an unintended transmit port.

(S2, No) If the switching hub 1-relayed frame is not unicast, but multicast or broadcast, (S9) then the switching processing unit 6 designates flooding for a destination subgroup indicated by the subgroup ID portion 130 of the VLAN-ID 13D written in the frame.

For example, as shown in FIG. 2, if the frame relay from the Tokyo headquarters 20 is designated as multicast, then the switching processing unit 6 designates flooding for a VLAN subgroup of designated ones of VLAN1-2, VLAN1-3, and VLAN1-4, and if the frame relay from the Tokyo headquarters 20 is designated as broadcast, then the switching processing unit 6 designates flooding for a VLAN subgroup of all of VLAN1-2, VLAN1-3, and VLAN1-4.

(S10) And as registration information on that frame, the receive port, subgroup ID portion 130, and source MAC address are registered into the FDB 7, followed by return to Step 5. (S4, No) The same is also applied when the destination of the unicast frame is not found in the FDB 7.

Modification

Figure 8:
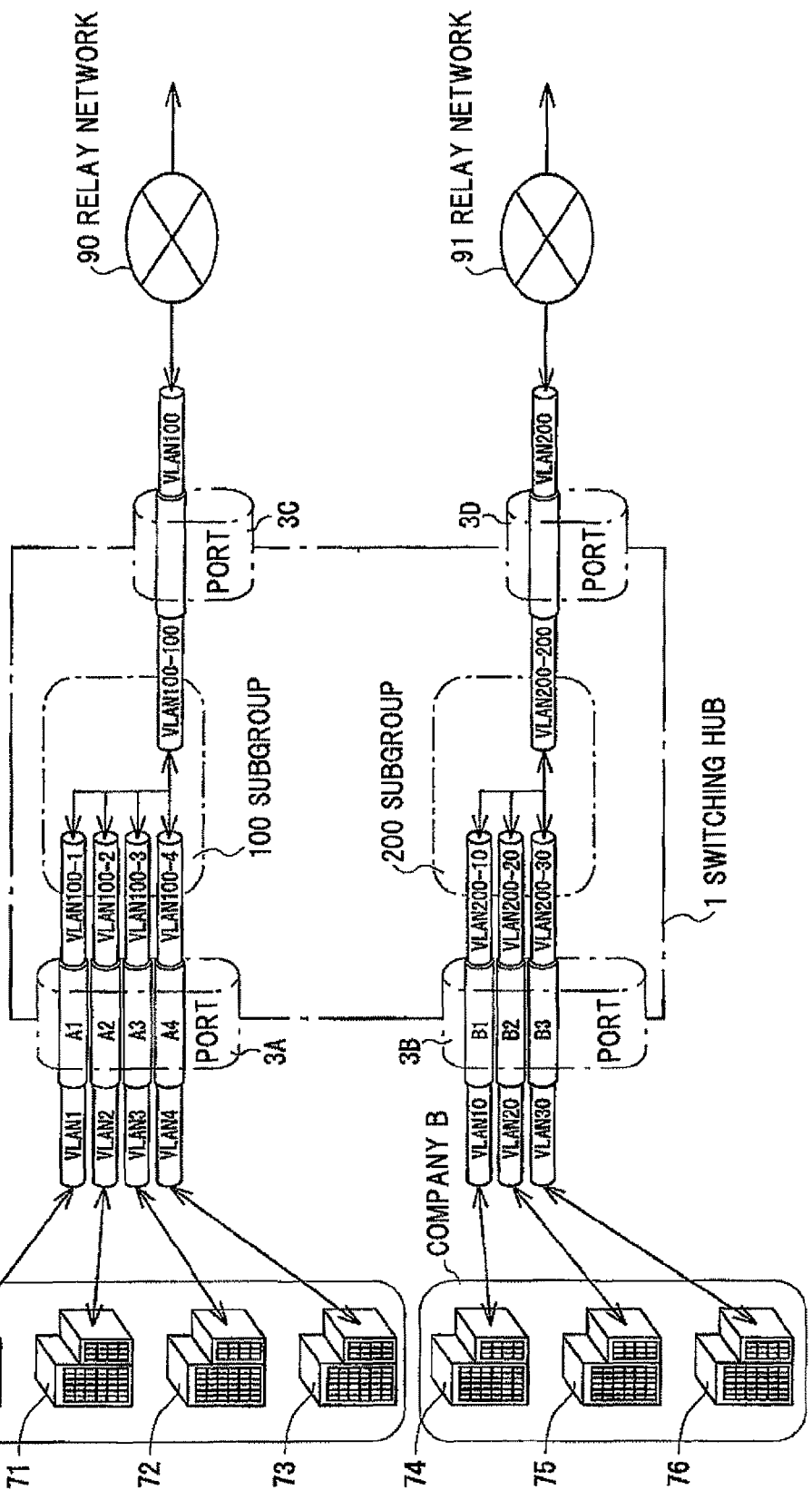
FIG. 8 is a schematic configurational diagram showing a modified switching hub.

FIG. 8 is a schematic configurational diagram showing a modified switching hub. This switching hub 1 comprises plural ports 3A-3D provided for connecting communication cables, such as LAN cables, etc., to a side of a body 2 explained with FIG. 1, where the ports 3A and 3B include plural virtual ports, the ports 3A and 3C belong to a subgroup 100, and the ports 3B and 3D belong to a subgroup 200.

In this modified example, the port 3A includes virtual ports A1-A4 for being connected to branches 70-73 present in specified areas of a company A, the port 3B includes virtual ports B1-B3 for being connected to branches 74-76 present in specified areas of a company B, the port 3C is provided as a frame input/output unit to the switching hub 1 for relaying the specified areas of the company A and the port 3D is provided as a frame input/output unit to the switching hub 1 for relaying the specified areas of the company B.

Use of the VLAN-ID settings explained in this embodiment allows the plural virtual ports to be set in the physical ports 3A and 3B. Here, VLAN1 to VLAN4 are defined for the port 3A and VLAN10 to VLAN30 are defined for the port 3B, and a bridge desired to be communicatable is defined in the VLAN subgroups. In this modified example, the subgroup 100 is defined for the company A and the subgroup 200 is defined for the company B.

The subgroup 100 is connected through the corresponding port 3C to a relay network 90 and has a set subgroup ID 100. Also, the subgroup 200 is connected through the corresponding port 3D to a relay network 91 and has a set subgroup ID 200.

In FIG. 8, the branch 70 belongs to the VLAN1 of the company A, the branch 71 belongs to the VLAN2, the branch 72 belongs to the VLAN3, and the branch 73 belongs to the VLAN4, and the VLAN1 belongs to VLAN100-1 of the subgroup 100 via the virtual port A1 of the port 3A. The sub-ID of the VLAN100-1 is 1. The VLAN2 belongs to VLAN100-2 of the subgroup 100 via the virtual port A2 of the port 3A. The sub-ID of the VLAN100-2 is 2. The VLAN3 belongs to VLAN100-3 of the subgroup 100 via the virtual port A3 of the port 3A. The sub-ID of the VLAN100-3 is 3. The VLAN4 belongs to VLAN100-4 of the subgroup 100 via the virtual port A4 of the port 3A. The sub-ID of the VLAN100-4 is 4.

Also, the branch 74 belongs to the VLAN10 of the company B, the branch 75 belongs to the VLAN20, and the branch 76 belongs to the VLAN30, and the VLAN10 belongs to VLAN200-10 of the subgroup 200 via the virtual port B1 of the port 3B. The sub-ID of the VLAN200-10 is 10. The VLAN20 belongs to VLAN200-20 of the subgroup 200 via the virtual port B2 of the port 3B. The sub-ID of the VLAN200-20 is 20. The VLAN30 belongs to VLAN200-30 of the subgroup 200 via the virtual port B3 of the port 3B. The sub-ID of the VLAN200-30 is 30.

Also, for the port 3C, there are defined the VLAN100 belonging to the subgroup 100, subgroup ID 100 and sub-ID 100 required for frame relays with the subgroup 100, and the subgroup 100 required for frame relays with the relay network 90.

Also, for the port 3D, there are defined the VLAN200 belonging to the subgroup 200, subgroup ID 200 and sub-ID 200 required for frame relays with the subgroup 200, and the subgroup 200 required for frame relays with the relay network 91.

Such configuration allows frame relays in the branches 70, 71, 72, and 73 within the company A in the subgroup 100, and frame relays through the relay network 90 from the branches 70, 71, 72, and 73.

It likewise allows frame relays in the branches 74, 75, and 76 within the company B in the subgroup 200, and frame relays through the relay network 91 from the branches 74, 75, and 76.

In frame relays with such virtual ports in the ports 3A and 3B, for example, when a frame from the branch 70 to the destination branch 73 is relayed to the virtual port A1 corresponding to the VLAN1 of the port 3A of the switching hub 1, the switching hub 1 references VLAN-ID contained in that frame, and its switching processing unit retrieves the frame relay destination based on VLAN subgroup ID and VLAN sub-ID corresponding to the virtual port and a source MAC address and VLAN subgroup ID of the frame. When the relay destination virtual port A3 is present within the same subgroup 100, the VLAN sub-ID contained in the VLAN-ID of the frame is substituted with the VLAN sub-ID 3 corresponding to the relay destination virtual port, which is relayed to the relevant virtual port A3.

As described above, in the branch-aggregating switching hub 1, the virtual ports are defined in its physical ports by the VLAN-IDs comprising associated VLAN subgroup IDs and VLAN sub-IDs, and for these virtual ports, the plural subgroups are defined and multiplexed, thereby allowing enhancement in relay scalability without any increase in the number of switching hub ports.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A switching hub, comprising:
a plurality of ports, each of which has a transmit port and a receive port; a control unit for setting a VLAN-ID for each of the transmit ports and the receive ports of each of the plurality of ports, respectively, the VLAN-ID comprising a subgroup ID of a subgroup constituting a VLAN, and a sub-ID of a group contained in the subgroup ID;
a filter processing unit comprising:
a receive filter processing unit for referencing the VLAN-ID of the frame, when the VLAN-ID contained in the frame matches a set VLAN-ID of the receive port, permitting forwarding of the frame to a switching processing unit, and when the VLAN-ID contained in the frame does not match the set VLAN-ID of the receive port, discarding the frame, and
a transmit filter processing unit for referencing the VLAN-ID of the frame received from the switching processing unit, when the VLAN-ID contained in the frame matches a set VLAN-ID of the transmit port, permitting forwarding of the frame to the transmit port, and when the VLAN-ID contained in the frame does not match the set VLAN-ID of the transmit port, discarding the frame; and
the switching processing unit for referencing the subgroup ID of the VLAN-ID in the frame received from the receive filter processing unit and relaying the frame to the port, when flooding the frame, the switching processing unit designating flooding for a destination subgroup indicated by the subgroup ID as a destination of the frame and relaying the frame to the transmit filter processing unit;

the VLAN-ID set for the transmit port and the VLAN-ID set for the receive port have the same subgroup ID.

2. The switching hub according to claim 1, wherein:
the VLAN-ID is contained in a VLAN tag of the frame prescribed in IEEE802.1Q.

3. The switching hub of claim 1, wherein VLAN-IDs have the same subgroup ID set for the transmit ports, and the VLAN-IDs have different sub-IDs set for the receive ports.

4. The switching hub of claim 1, wherein VLAN-IDs set for the transmit ports and VLAN-IDs set for the receive ports have the same subgroup ID, and the VLAN-IDs set for the transmit ports and the VLAN-IDs set for the receive ports have sub-IDs different from each other in each port.

5. A switching hub, comprising:
a plurality of ports for transmitting/receiving a frame, each of which comprises a transmit port and a receive port;
a port processing unit comprising a receive port processing unit for selectively adding a tag to the frame based on the presence/absence of a VLAN tag of the received frame, and on a set VLAN-ID of the receive port, and a transmit port processing unit for selectively deleting a tag from the frame based on a set VLAN-ID of the transmit port;
a filter processing unit comprising:
a receive filter processing unit for referencing the VLAN tag of the frame to, when a VLAN-ID contained in the VLAN tag of the frame matches the set VLAN-ID of the receive port, permit forwarding of the frame to a switching processing unit, and when VLAN-ID contained in the VLAN tag of the frame does not match the set VLAN-ID of the receive port, discard the frame, and
a transmit filter processing unit for referencing the VLAN tag of the frame to, when the VLAN-ID contained in the VLAN tag of the frame matches the set VLAN-ID of the transmit port, permit forwarding of the frame to the transmit port, and when the VLAN-ID contained in the VLAN tag of the frame does not match the set VLAN-ID of the transmit port, discard the frame;
the switching processing unit for referencing registered information based on retrieval from a FDB (Forwarding Data Base) to determine a relay of the frame added with the VLAN tag containing the VLAN-ID; and
a control unit for setting a VLAN-ID for each of the transmit port and the receive port of the port, respectively, to contain a subgroup ID of a subgroup contained in a VLAN and a sub-ID of a group contained in the subgroup ID, wherein the switching processing unit references the subgroup ID of the VLAN-ID in the frame received from the transmit filter processing unit and relays the frame to the port,
wherein when the registered information is not found in the FDB, the switching processing unit designates flooding for a destination subgroup indicated by the subgroup ID as a destination of the frame and relays the frame to the transmit filter processing unit;
the VLAN-ID set for the transmit port and the VLAN-ID set for the receive port have the same subgroup ID.

6. The switching hub according to claim 5, wherein:
the VLAN-ID is contained in the VLAN tag of the frame prescribed in IEEE802.1Q.

7. A switching hub, comprising:
a plurality of ports for transmitting/receiving a frame, each of which comprises a transmit port and a receive port, and the frame comprising a VLAN-ID comprising a subgroup ID of a subgroup constituting a VLAN, and a sub-ID of a group contained in the subgroup ID;
a port processing unit comprising a receive port processing unit for selectively adding a tag to the frame based on the presence/absence of a VLAN tag of the received frame, and on a set VLAN-ID of the receive port, and a transmit port processing unit for selectively deleting a tag from the frame based on a set VLAN-ID of the transmit port;
a filter processing unit comprising:
a receive filter processing unit for referencing the VLAN tag of the frame to, when the VLAN-ID contained in the VLAN tag of the frame matches the set VLAN-ID of the receive port, permit forwarding of the frame to a switching processing unit, and when the VLAN-ID contained in the VLAN tag of the frame does not match the set VLAN-ID of the receive port, discard the frame, and
a transmit filter processing unit for referencing the VLAN tag of the frame to, when the VLAN-ID contained in the VLAN tag of the frame matches the set VLAN-ID of the transmit port, permit forwarding of the frame to the transmit port, and when the VLAN-ID contained in the VLAN tag of the frame does not match the set VLAN-ID of the transmit port, discard the frame;
the switching processing unit for referencing registered information based on retrieval of a set of the VLAN-ID information contained in the frame and a source MAC (Media Access Control) address of the frame, from a FDB (Forwarding Data Base), to determine a relay of the frame added with the VLAN tag containing the VLAN-ID; and
a control unit for setting a VLAN-ID for each of the transmit port and the receive port of the port, respectively, to contain the subgroup ID of the subgroup contained in the VLAN and the sub-ID of the group contained in the subgroup ID, wherein the switching processing unit references the subgroup ID of the VLAN-ID in the frame received from the transmit filter processing unit and relays the frame to the port, wherein the subgroup ID is used as an information of the VLAN-ID as a retrieval information for the FDB,
wherein when the registered information is not found in the FDB, the switching processing unit designates flooding for a destination subgroup indicated by the subgroup ID as a destination of the frame and relays the frame to the transmit filter processing unit;
the VLAN-ID set for the transmit port and the VLAN-ID set for the receive port have the same subgroup ID.

8. The switching hub according to claim 7, wherein:
the VLAN-ID is contained in the VLAN tag of the frame prescribed in IEEE802.1Q.

9. A VLAN system, comprising:
a switching hub comprising:
a plurality of ports, each of which has a transmit port and receive port;
a control unit for setting a VLAN-ID for each of the transmit port and the receive port of the port, respectively, the VLAN-ID comprising a subgroup ID of a subgroup constituting a VLAN and a sub-ID of a group contained in the subgroup ID;
a filter processing unit comprising:
a receive filter processing unit for referencing the VLAN-ID of the frame, when the VLAN-ID contained in the frame matches a set VLAN-ID of the receive port, permitting forwarding of the frame to a switching processing unit, and when the VLAN-ID contained in the frame does not match the set VLAN-ID of the receive port, discarding the frame, and
a transmit filter processing unit for referencing the VLAN-ID of the frame received from the switching processing unit, when the VLAN-ID contained in the frame matches a set VLAN-ID of the transmit port, permitting forwarding of the frame to the transmit port, and when the VLAN-ID contained in the frame does not match the set VLAN-ID of the transmit port, discarding the frame; and the switching processing unit for referencing the subgroup ID of the VLAN-ID in the frame received from the receive filter processing unit and relaying the frame to the port, when flooding the frame, the switching processing unit designating flooding for a destination subgroup indicated by the subgroup ID as a destination of the frame and relaying the frame to the transmit filter processing unit, wherein the VLAN system receives a frame relayed to the switching hub from a transmitting source constituting the VLAN at the port set to the VLAN-ID, and relays it from the switching hub to a destination via the port set to the VLAN-ID;

the VLAN-ID set for the transmit port and the VLAN-ID set for the receive port have the same subgroup ID.

10. The VLAN system according to claim 9, wherein:

the VLAN-ID is contained in a VLAN tag of the frame prescribed in IEEE802.1Q.

* * * * *